United States Patent
Bhat et al.

(10) Patent No.: US 11,276,188 B2
(45) Date of Patent: Mar. 15, 2022

(54) STABILIZING IMAGES PRODUCED BY EYE-MOUNTED DISPLAYS, BASED ON IMAGES OF THE EXTERNAL ENVIRONMENT CAPTURED BY EYE-MOUNTED IMAGING DEVICES

(71) Applicant: Tectus Corporation, Saratoga, CA (US)

(72) Inventors: Abhishek Deepak Bhat, Sunnyvale, CA (US); Ramin Mirjalili, San Jose, CA (US); Brian Elliot Lemoff, Morgan Hill, CA (US); Joseph Czompo, San Jose, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 138 days.

(21) Appl. No.: 16/865,079

(22) Filed: May 1, 2020

(65) Prior Publication Data
US 2021/0343033 A1     Nov. 4, 2021

(51) Int. Cl.
*G06T 7/33*     (2017.01)
*G06F 3/01*     (2006.01)
(Continued)

(52) U.S. Cl.
CPC .......... *G06T 7/337* (2017.01); *G02B 27/0172* (2013.01); *G02B 27/0179* (2013.01);
(Continued)

(58) Field of Classification Search
CPC .. G06T 7/33; G06T 7/337; G06T 7/32; G06T 7/246; G02B 27/0172; G02B 27/0179; G02C 11/10; G06F 3/013
See application file for complete search history.

(56) References Cited

U.S. PATENT DOCUMENTS

| | | |
|---|---|---|
| 6,851,805 B2 | 2/2005 | Blum |
| 2003/0021601 A1 | 1/2003 | Goldstein |

(Continued)

OTHER PUBLICATIONS

Zewail, Ahmed. "Light and life." Current Science 84.1 (2003): 29-33.*

(Continued)

*Primary Examiner* — Sarah Lhymn
(74) *Attorney, Agent, or Firm* — Fenwick & West LLP

(57) ABSTRACT

An imaging device contained in a contact lens captures images of the external environment, which for convenience will be referred to as real-world images. These real-world images are used to stabilize images produced by a femtoprojector also in the contact lens. For convenience, the images produced by the femtoprojector will be referred to as augmented reality or AR images. The femtoprojector is inward-facing (i.e., facing towards the interior of the eye) and projects the AR images onto the user's retina, creating the appearance of virtual images in the external environment. The imaging device, referred to as a femtoimager for convenience, is outward-facing and captures a sequence of actual real-world images of the external environment. Because the femtoimager and femtoprojector move together, the real-world images captured by the femtoimager reflect the motion of the virtual AR images from the femtoprojector relative to the external environment.

20 Claims, 25 Drawing Sheets
(9 of 25 Drawing Sheet(s) Filed in Color)

(51) Int. Cl.
  *G06T 7/32*      (2017.01)
  *G06T 7/246*     (2017.01)
  *H04N 9/31*      (2006.01)
  *G06T 3/20*      (2006.01)
  *G02B 27/01*     (2006.01)
  *G02C 11/00*     (2006.01)
  *G06T 3/60*      (2006.01)
  *H04N 5/225*     (2006.01)

(52) U.S. Cl.
  CPC .............. *G02C 11/10* (2013.01); *G06F 3/013* (2013.01); *G06T 3/20* (2013.01); *G06T 3/60* (2013.01); *G06T 7/246* (2017.01); *G06T 7/32* (2017.01); *H04N 9/3173* (2013.01); *G02B 2027/014* (2013.01); *G02B 2027/0138* (2013.01); *G02B 2027/0187* (2013.01); *G06T 2207/10016* (2013.01); *H04N 5/2253* (2013.01)

(56) References Cited

U.S. PATENT DOCUMENTS

| | | |
|---|---|---|
| 2016/0091737 A1 | 3/2016 | Kim |
| 2016/0097940 A1 | 4/2016 | Sako |
| 2016/0299354 A1 | 10/2016 | Shtukater |
| 2017/0371184 A1 | 12/2017 | Shtukater |
| 2018/0017811 A1 | 1/2018 | Perozziello |
| 2018/0136492 A1 | 5/2018 | An |
| 2018/0316224 A1 | 11/2018 | Maynard |
| 2018/0348620 A1* | 12/2018 | Miller ................ G02B 27/0093 |
| 2018/0373058 A1 | 12/2018 | Bostick |

OTHER PUBLICATIONS

Burkardt, Matthias. "Transverse Force Tomography." (2018).*
Wu et al., Eulerian Video Magnification for Revealing Subtle Changes in the World, ACM Trans Graphics v31, n4, (2012) 8 pages.

* cited by examiner frame 0 current template current frame current template current frame current template current frame template 0

STABILIZING IMAGES PRODUCED BY EYE-MOUNTED DISPLAYS, BASED ON IMAGES OF THE EXTERNAL ENVIRONMENT CAPTURED BY EYE-MOUNTED IMAGING DEVICES

BACKGROUND

Technical Field

This disclosure relates generally to image stabilization for eye-mounted displays.

Description of Related Art

In one type of eye-mounted display, a tiny projector (referred to as a femtoprojector for convenience) is mounted inside a contact lens. A typical femtoprojector preferably is no larger than about one or two millimeters in any dimension. The femtoprojector produces images and projects those images onto the user's retina. If the external environment is also visible, the projected images will be overlaid on the user's view of the external environment.

As the user's eye moves, the contact lens and femtoprojector also move—and the user's eye is always moving. Even when the user's gaze is fixed at a stationary point, the eye is still in motion. Microsaccades and other types of involuntary eye motion occur continuously as part of the human visual process. Because the femtoprojector moves with the user's eye, this constant eye motion also constantly changes the location of where the projected image appears relative to the external environment. This is undesirable if the projected image is intended to remain in a fixed position relative to the external environment. Even in cases where the projected image is intended to move, the type of image movement caused by the eye motion may be undesirable. For example, the intention may be for the projected image to move along a smooth trajectory, but the eye motion may cause unacceptable jitter in the motion of the image.

Head-mounted, helmet-mounted and other types of displays that are not mounted on the eye itself do not have this issue because those types of displays do not move with the eye. Eye motion does not affect the alignment of those displays with the external environment. In addition, even if those devices were to track eye motion, those types of eye tracking systems typically occupy much more volume and consume much more power than would be available in an eye-mounted display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

An imaging device contained in a contact lens captures images of the external environment, which for convenience will be referred to as real-world images. These real-world images are used to stabilize images produced by a femtoprojector also in the contact lens. For convenience, the images produced by the femtoprojector will be referred to as augmented reality or AR images. The femtoprojector is inward-facing (i.e., facing towards the interior of the eye) and projects the AR images onto the user's retina, creating the appearance of virtual images in the external environment. The imaging device, referred to as a femtoimager for convenience, is outward-facing and captures a sequence of actual real-world images of the external environment.

Because the femtoprojector and the user's eye move together, the AR images projected from the femtoprojector will appear to move in the external environment as the user's eye moves. For example, if the eye rotates to the left, the femtoprojector in the contact lens will move accordingly and the AR image from the femtoprojector will now appear overlaid on the external environment to the left of where it previously appeared. However, because the femtoimager and femtoprojector move together, the real-world images captured by the femtoimager reflect the motion of the virtual AR images from the femtoprojector relative to the external environment. In the above example, the femtoimager will now capture real-world images of the external environment to the left of what was previously captured. By comparing the real-world images captured by the femtoimager over time, the motion of the AR images relative to the external environment may be estimated and compensated. The motion of the eye itself may or may not be estimated in addition to the image stabilization.

One approach uses templates of pixels. A template defined by a region of pixels in a real-world image is selected. For example, the template may be a 100×100 pixel region with some amount of detail. The template is tracked in the real-world images, thus providing information that may be used to compensate for unwanted motion of the virtual AR images projected by the femtoprojector.

Another approach uses features. Features, such as corners, edges, etc. are extracted from a real-world image. These features are then tracked in the real-world images, thus providing information that may be used to compensate for the unwanted motion of the virtual AR images.

Figure 1A:
FIG. 1A shows a user wearing an electronic contact lens containing a projector (femtoprojector) and an imaging device (femtoimager).
Figure 1B:
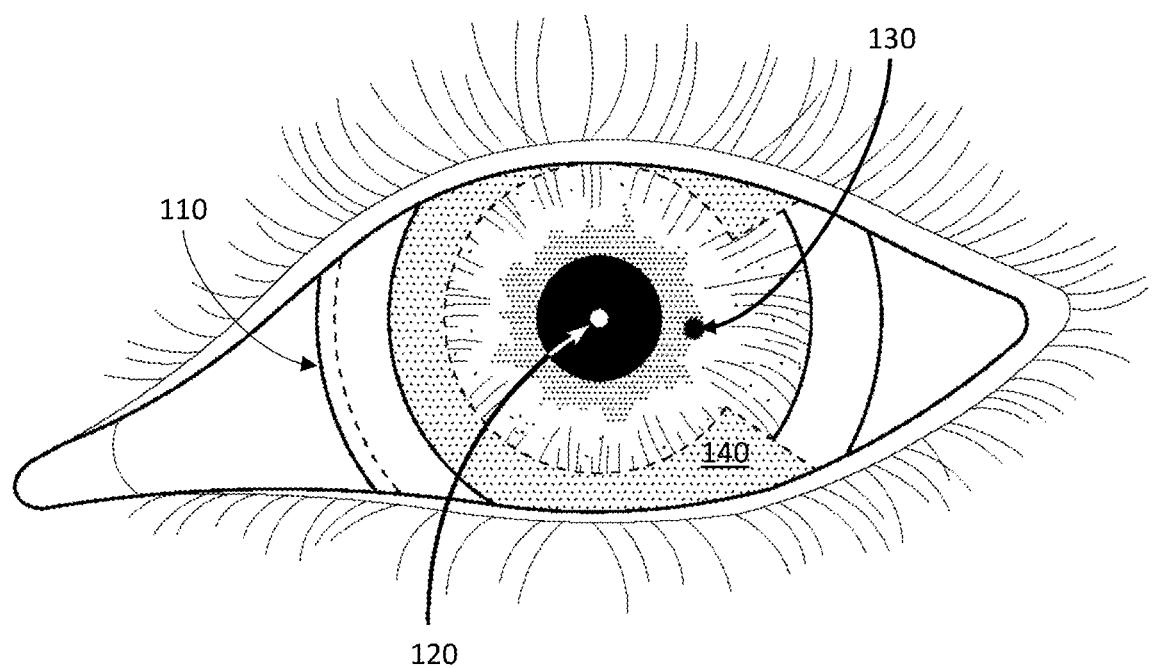
FIG. 1B shows a magnified view of the electronic contact lens mounted on the user's eye.
Figure 1C:
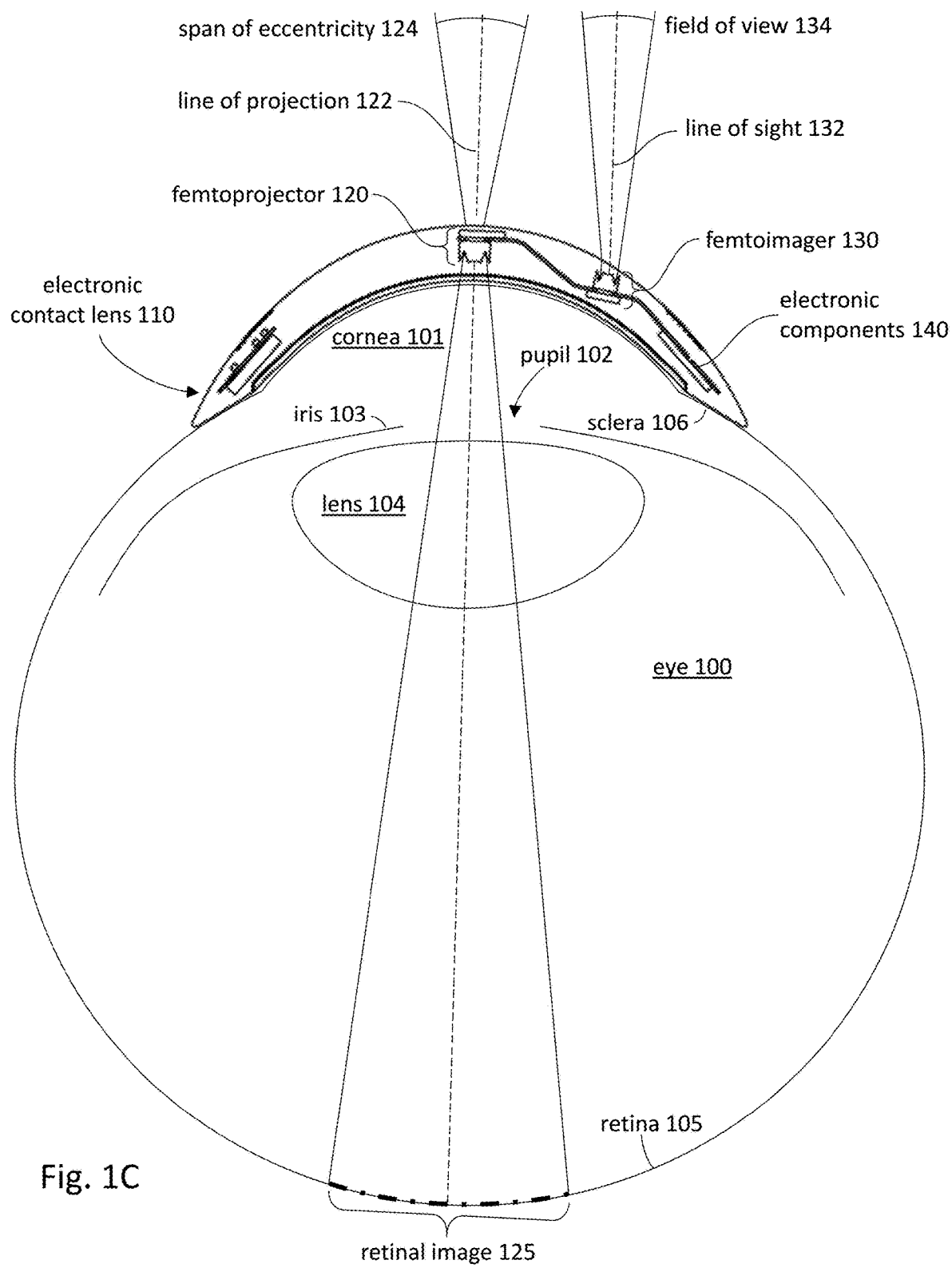
FIG. 1C shows a cross sectional view of the electronic contact lens mounted on the user's eye.

FIG. 1A shows a user wearing a pair of electronic contact lenses 110. FIG. 1B shows a magnified view of one of the electronic contact lenses 110, and FIG. 1C shows a cross sectional view of the electronic contact lens 110. The electronic contact lens 110 is worn on the surface of the user's eye. The following examples use a scleral contact lens in which the contact lens is supported by the sclera of the user's eye, but the contact lens does not have to be scleral.

As shown in FIG. 1B, the electronic contact lens 110 contains a femtoprojector 120 and a femtoimager 130. The femtoprojector 120 is a small projector that projects images inward onto the user's retina. It is located in a central region of the contact lens, so that light from the femtoprojector 120 propagates through the user's pupil to the retina. The femtoprojector 120 typically includes an electronics backplane (e.g., driver circuitry), a frontplane of light emitting elements (e.g., an LED array), and projection optics. The frontplane produces an image (referred to as the source image), which is optically projected by the projection optics through the various eye structures and onto the retina 105, as shown in FIG. 1C.

The femtoimager 130 is a small imager that is outward facing and captures images of the external environment. In this example, it is located outside the central region of the contact lens so that it does not block light from entering the user's eye. The femtoimager 130 typically includes imaging optics, a sensor array and sensor circuitry. The imaging optics images a portion of the external environment onto the sensor array, which captures the image. The sensor array may be an array of photodiodes. In some embodiments, the sensor array operates in a visible wavelength band (i.e., ~390 nm to 770 nm). Alternatively or additionally, the sensor array operates in a non-visible wavelength band, such as an infrared (IR) band (i.e., ~750 nm to 10 μm) or an ultraviolet band (i.e., <390 nm). For example, the sensor array may be a thermal infrared sensor.

The lead line from reference numeral 110 in FIG. 1B points to the edge of the contact lens. The femtoprojector 120 and femtoimager 130 typically are not larger than 2 mm wide. The ratio of the contact lens diameter to femtoprojector or femtoimager lateral size is preferably roughly 15:1. This ratio is normally between about 15:1 and 30:1, but may be as small as 5:1 or smaller or as large as 50:1 or larger.

The electronic contact lens also includes other electronics, which may be located in the peripheral zone 140. Electronic components in the lens may include microprocessors/controllers, motion sensors (such as accelerometers, gyroscopes and magnetometers), radio transceivers, power circuitry, antennas, batteries and elements for receiving electrical power inductively for battery charging (e.g., coils). For clarity, connections between the femtoprojector, femtoimager and electronics are not shown in FIG. 1B. Zone 140 may optionally be cut out, for example on the temporal (as opposed to nasal) side of the contact lens as shown in FIG. 1B. The electronic contact lens may include cosmetic elements, for example covering the electronics in zone 140. The cosmetic elements may be surfaces colored to resemble the iris and/or sclera of the user's eye.

FIG. 1C shows a cross sectional view of the electronic contact lens mounted on the user's eye. For completeness, FIG. 1C shows some of the structure of the eye 100, including the cornea 101, pupil 102, iris 103, lens 104, retina 105 and sclera 106. The electronic contact lens 110 preferably has a thickness that is less than two mm. The contact lens 110 maintains eye health by permitting oxygen to reach the cornea 150.

The femtoimager 130 is outward-facing, so that it "looks" away from the eye 100 and captures images of the surrounding environment. The femtoimager 130 is characterized by a line of sight 132 and a field of view (FOV) 134, as shown in FIG. 1C. The line of sight 132 indicates the direction in which the femtoimager is looking, and the field of view 134 is a measure of how much the femtoimager sees. If the femtoimager is located on the periphery of the contact lens, the contact lens surface will be sloped and light rays will be bent by refraction at this interface. Thus, the direction of the line of sight 132 in air will not be the same as the direction within the contact lens material. Similarly, the angular FOV in air (i.e., the external environment) will not be the same as the angular FOV in the contact lens material. The terms line of sight and FOV refer to these quantities as measured in the external environment (i.e., in air).

The femtoprojector 120 projects an image onto the user's retina. This is the retinal image 125 shown in FIG. 1C. This optical projection from femtoprojector 120 to retina 105 is also characterized by an optical axis, as indicated by the dashed line within the eye in FIG. 1C, and by some angular extent, as indicated by the solid lines within the eye in FIG. 1C. However, the femtoprojector typically will not be described by these quantities as measured internally within the eye. Rather, it will be described by the equivalent quantities as measured in the external environment. The retinal image 125 will appear as a virtual image in the external environment. The virtual image has a center, which defines the line of projection 122 for the femtoprojector. The virtual image will also have some spatial extent, which defines the "span of eccentricity" 124 for the femtoprojector. As with the femtoimager line of sight and FOV, the terms line of projection and span of eccentricity (SoE) for the femtoprojector refer to these quantities as measured in the external environment.

In augmented reality applications, the virtual image from the femtoprojector is superimposed on the user's view of the external environment. However, the electronic contact lens 110 moves with the user's eye as the user's eye rotates in its socket. Because the femtoprojector 120 is mounted in the contact lens 110, it also moves with the user's eye, which means that the virtual AR image moves relative to the external environment. To keep the virtual image stationary relative to the external environment, the femtoimager 130 captures images of the external environment and these are used to compensate for the eye movement.

Figure 2A:
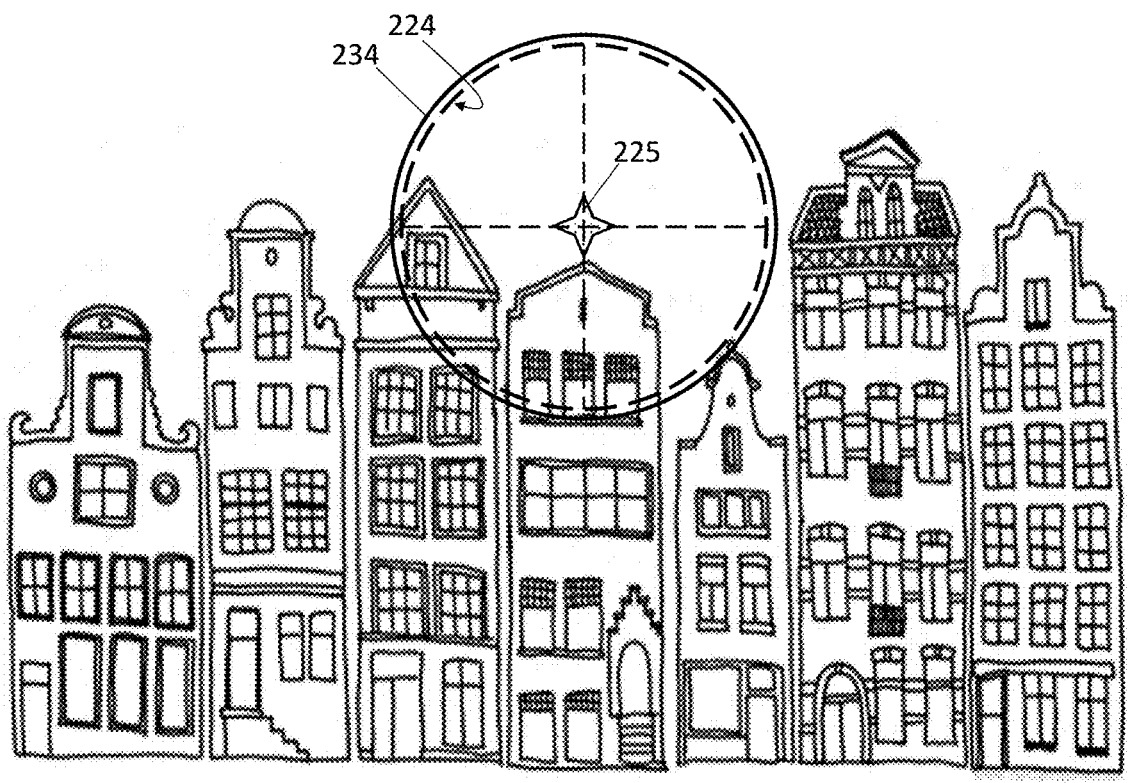
FIG. 2A shows a user's view of the external environment, including indications for the femtoprojector and the femtoimager.

FIGS. 2A-2D illustrate a method for stabilizing AR images relative to the external environment. FIG. 2A shows a user's view of the external environment, including overlays for the femtoprojector and the femtoimager. The user is viewing a row of buildings in the real world. The dashed circle 224 represents the femtoprojector's span of eccentricity and the spatial extent of the virtual image projected by the femtoprojector. The dashed crosshairs show the center of the virtual image and the SoE, which also corresponds to the center of the light emitting elements for the femtoprojector frontplane. For convenience, assume this is an LED array. In this example, the virtual image 224 includes a star 225 which appears on top of one of the buildings. The virtual object 225 does not exist in the real-world scene. It is projected by the femtoprojector onto the retina of the person wearing the electronic contact lens. This produces the appearance of a star 225 in the real world. The star 225 is positioned in the center of the virtual image 224, which means that the original source image for the star is produced in the corresponding center of the LED array. The solid circle 234 represents the field of view of the femtoimager. The femtoimager captures images of the real world within the field of view 234.

The femtoimager FOV 234 and femtoprojector SoE 224 may be similar in size, or one may be larger or smaller than the other. In one application, the femtoimager FOV and femtoprojector SoE are approximately the same—around 15 degrees full field. The femtoprojector source is a 256×256 LED array, which is approximately 0.5 mm wide or approximately 2 microns per pixel. The sensor for the femtoimager is also 256×256 pixels. In other designs, the femtoprojector and the femtoimager may have higher (or lower) resolutions, SoEs and FOVs. In other implementations, the femtoimager FOV and femtoprojector SoE may also be different and may not be centered with respect to each other. They may have different centers. They may even be non-overlapping.

Figure 2B:
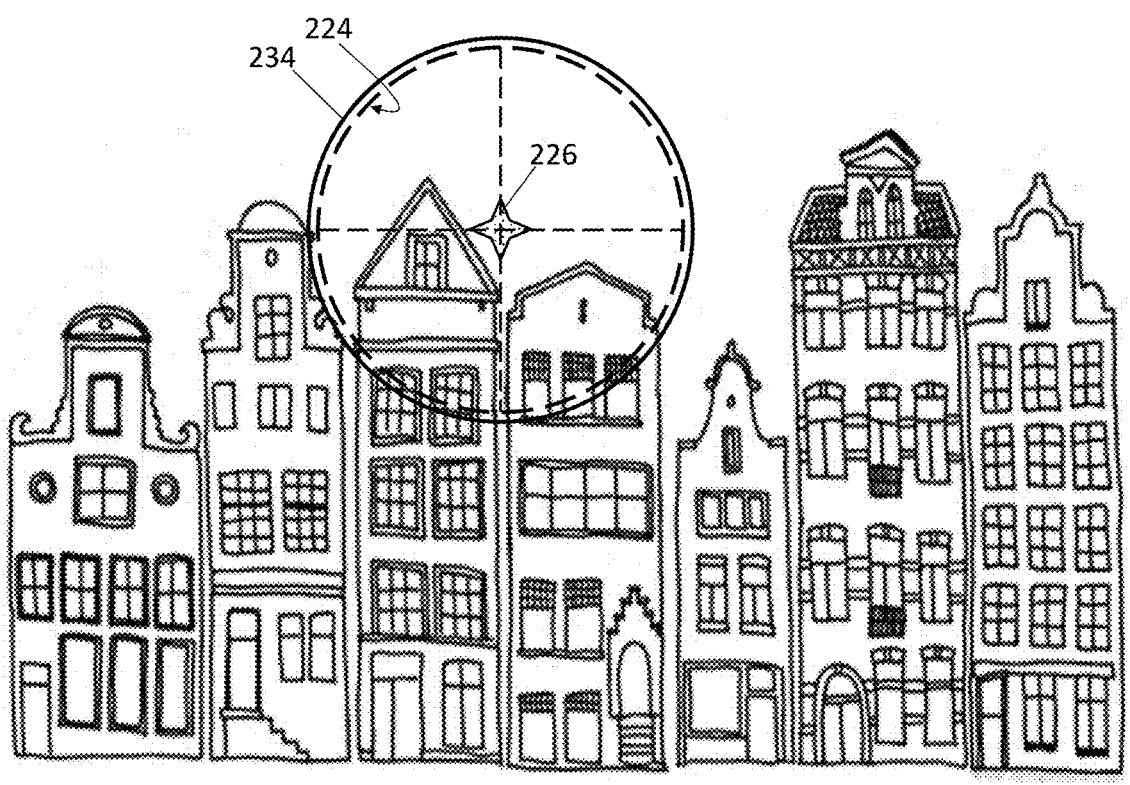
FIG. 2B shows the situation of FIG. 2A, where the user's gaze has shifted to the left.

FIG. 2B shows the situation of FIG. 2A, where the user's gaze has shifted to the left. The user may have rotated his eyes to the left, or he may have rotated his head to the left. In either case, the orientation of the electronic contact lens, and also the femtoprojector and femtoimager in the contact lens, are all shifted to the left. If the contact lens is mounted at a fixed position on the user's eye, and the femtoprojector and femtoimager have fixed positions within the contact lens, then the user's eye, the contact lens, the femtoprojector and the femtoimager will all move in unison. The femtoprojector SoE 224 and the femtoimager FOV 234 in FIG. 2B reflect the eye's new orientation. The dashed crosshairs also move to the left. If the source image for the virtual star remains located at the center of the LED array of the femtoprojector, then the corresponding virtual image 226 will appear to shift to the left relative to the real world. FIG. 2B shows only translation without rotation. Depending on the eye motion, the virtual image may also appear to rotate relative to the real world. Without compensation, there will be a visual misalignment between the virtual image and the real world. FIG. 2B shows a situation with a significant amount of motion. One example is when the user's eye undergoes smooth pursuit motion to track a moving object.

Figure 2C:
FIG. 2C shows the situation of FIG. 2A, where the user is fixated on a single point.
Figure 2D:
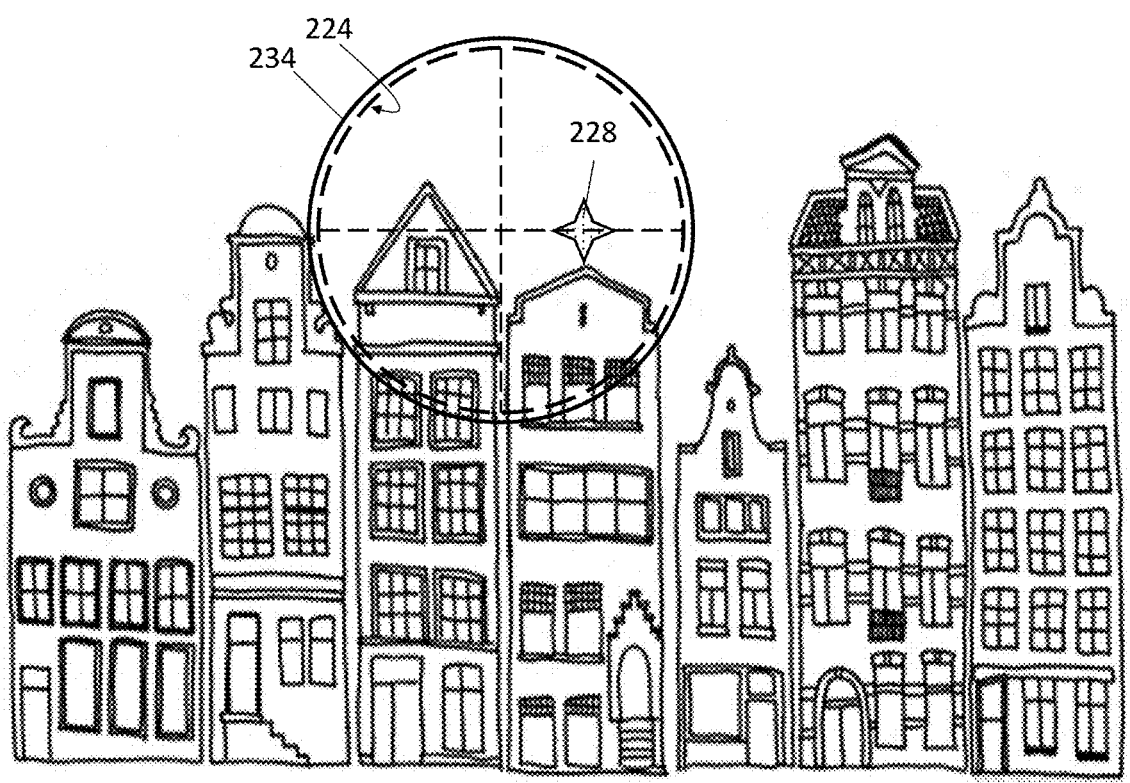
FIG. 2D shows the situation of FIG. 2A, where the user's gaze has shifted to the left but the virtual image is stabilized in place.

However, the eye is constantly in motion, even when the user's gaze is fixated at a single point. FIG. 2C shows the situation of FIG. 2A, where the user is gazing at a fixed point. However, the user's eye still undergoes involuntary motion, for example microsaccadic motion. If the virtual star remains located at the center of the LED array, then the corresponding virtual image may jump around to different locations as a result of these involuntary eye movements, as shown by the multiple images 227 of the star in FIG. 2C. For clarity, the femtoprojector SoE and femtoimager FOV are not shown in FIG. 2C.

Visual instability of the virtual object may also result from imperfections in the electronic contact lens system. For example, instability, jitter, or drift in the system may cause visual misalignment of the virtual image relative to the external environment.

As shown in FIGS. 2A-2C, motion of the user's eye causes the virtual image to move relative to the external environment. If the amount and orientation of this relative motion were known, then it could be compensated by introducing a corresponding offset of the source image on the LED array. If the virtual star 226 moves the equivalent of three pixels to the left in FIG. 2B, rather than producing the original star image in the center of the LED array, it may be shifted by three pixels to compensate. This would result in the situation shown in FIG. 2D, where the femtoprojector SoE and femtoimager FOV have shifted to the left, but the virtual star 228 remains centered above the middle building.

Figure 3:
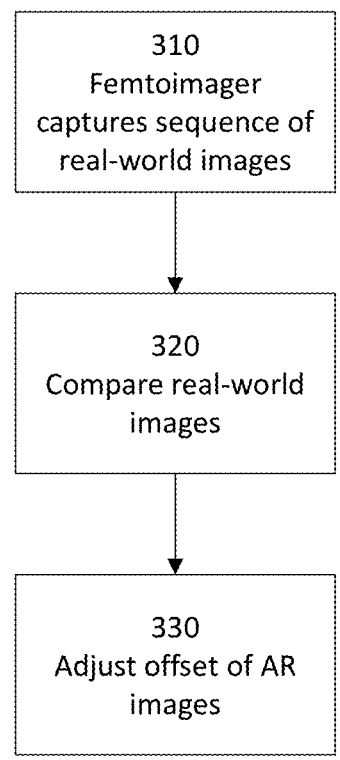
FIG. 3 is a flow diagram of a method for stabilizing the virtual images projected by the femtoprojector.

FIG. 3 is a flow diagram of a method for stabilizing the virtual images projected by the femtoprojector. The initial position of the virtual image may be determined based on other data, such as from inertial motion sensors. Regardless of how it is initially placed, the virtual image is then stabilized relative to the background scene and its initial placement using the method of FIG. 3. As shown in FIG. 2, the motion of the virtual image (i.e., femtoprojector SoE) relative to the external environment is also reflected in the motion of the femtoimager FOV relative to the external environment. In the example of FIG. 2, the femtoprojector SoE and femtoimager FOV are centered relative to each other and move together. The method of FIG. 3 uses the known relation between the femtoprojector SoE and femtoimager FOV to stabilize the virtual image based on images of the environment captured by the femtoimager.

Figure 4A:
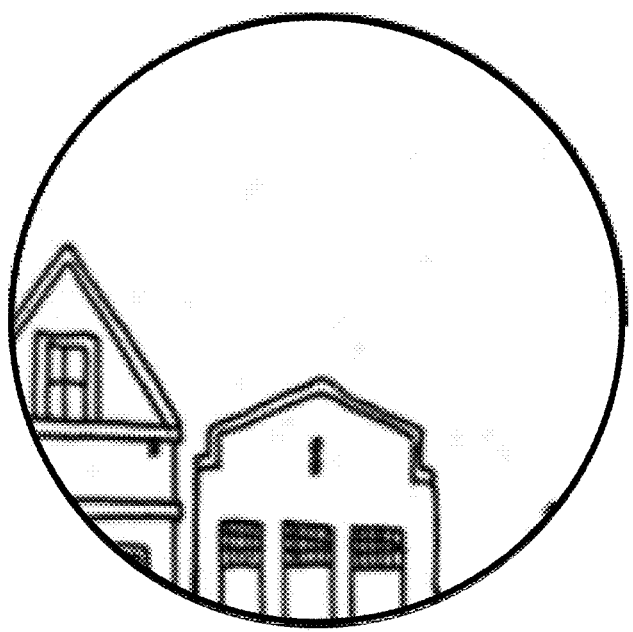
FIGS. 4A and 4B are real-world images captured by a femtoimager at different times.
Figure 4B:
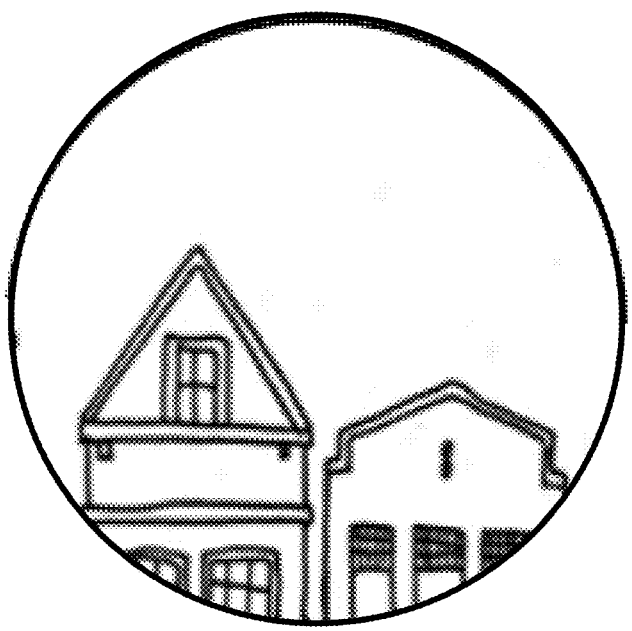

In FIG. 3, the outward-facing femtoimager captures 310 a sequence of images (frames) of the external environment. For example, it may capture one frame at the time of FIG. 2A and another frame at the time of FIG. 2B (or FIG. 2D). These frames are shown in FIGS. 4A and 4B. The real-world frames are compared 320, and the position of the AR image produced by the femtoprojector is adjusted 330 based on the comparison. Comparing FIGS. 4A and 4B, it can be determined that the femtoimager FOV has shifted to the left by a certain amount. Because the relation of the femtoprojector SoE and the femtoimager FOV are known, the amount of shift of the femtoprojector SoE can also be calculated. In this example, they are the same. The source AR image may then be offset by a corresponding amount on the LED array to compensate. The offset may be a translation and/or rotation. In this example, the offset is primarily a horizontal shift, without significant vertical or rotational compensation.

Different approaches may be used to implement step 320. One approach is based on tracking movement of a template within the sequence of real-world images. A "template" is a region of pixels within a real-world frame. For example, in FIG. 4, the template may be a rectangular region of pixels with a distinctive roofline, windows or other architectural elements. The template is tracked across frames, so the template should have distinctive characteristics that facilitate this tracking. For example, the template may be selected based on the detail and/or contrast in a region. The size of the template may vary depending on the motion being tracked. Larger templates provide higher confidence in tracking from frame to frame, but require more computational resources and are slower to implement. In addition, if the eye motion is faster, then consecutive frames will have less overlap, so larger templates may be out of view sooner. When a template approaches the edge of the frame, it may be replaced by another template that is currently closer to the center of the frame. Alternatively, sequential latching may be used where the template is updated every N frames. In one approach, the size of the template is selected based on the speed of the eye motion.

Figure 5A:
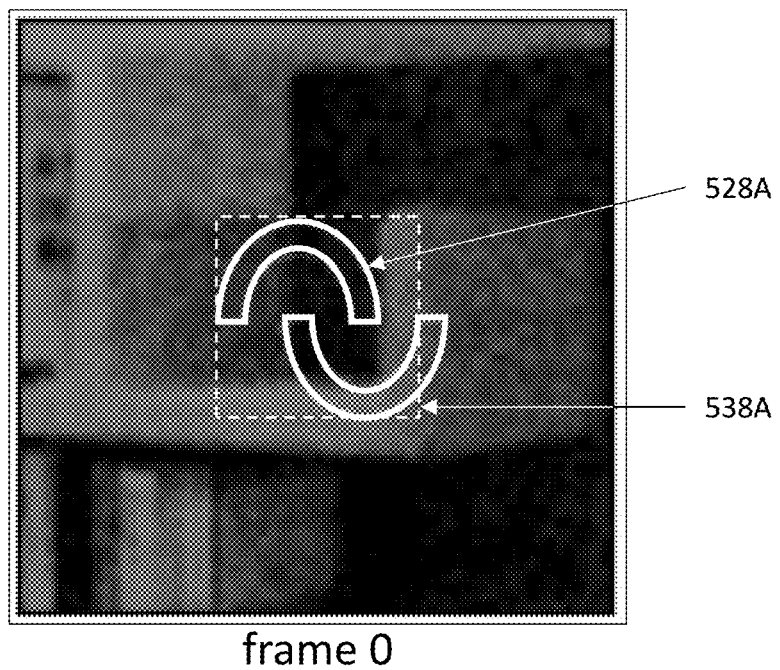
FIGS. 5A-5C are simulated images that show template-based image stabilization.
Figure 5A:
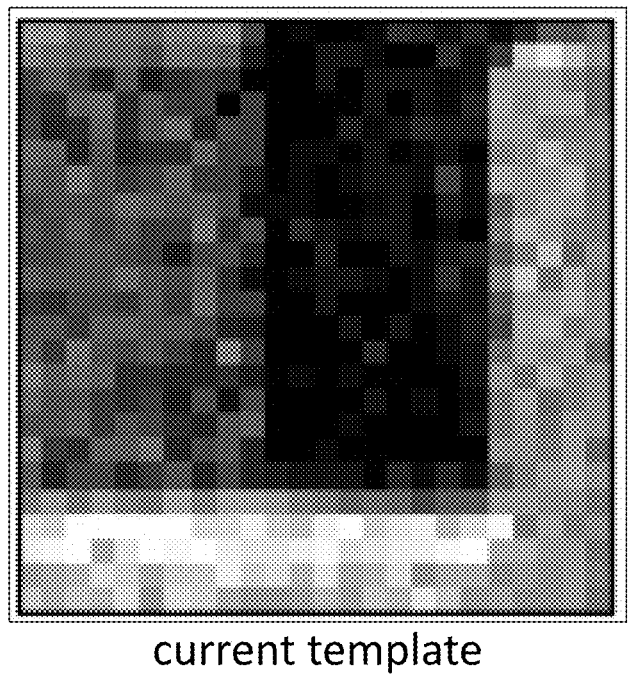
Figure 5B:
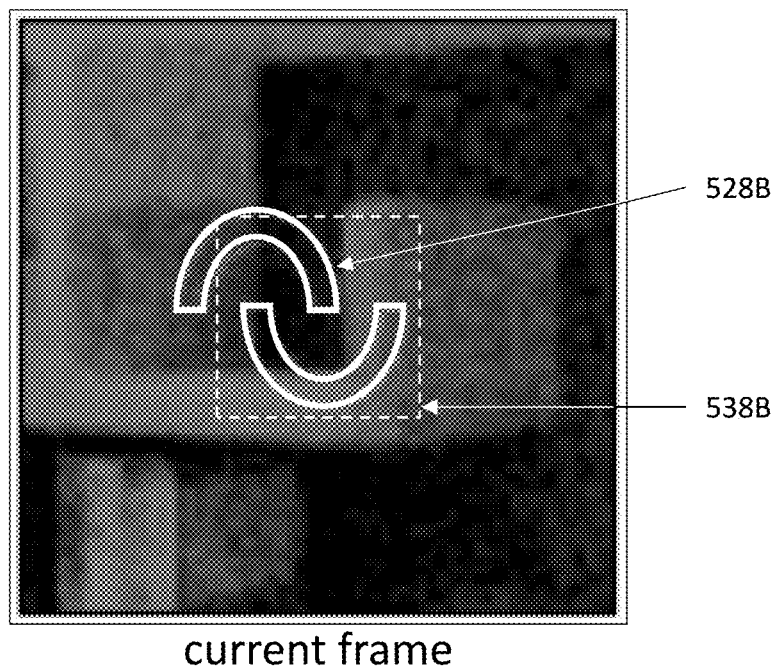
Figure 5B:
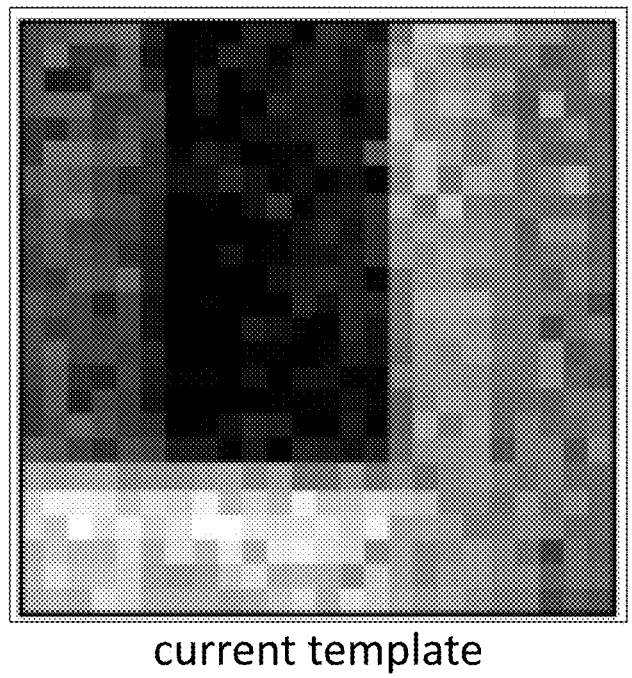
Figure 5C:
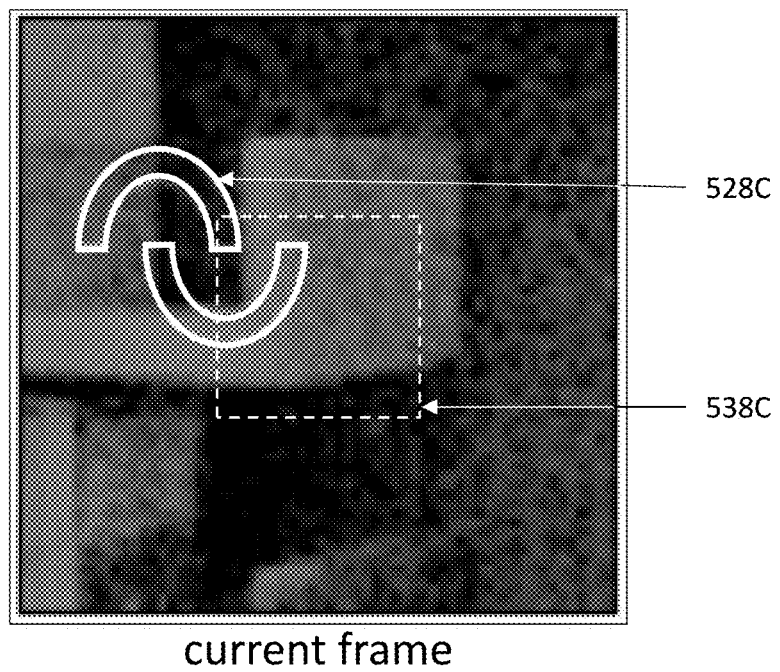
Figure 5C:
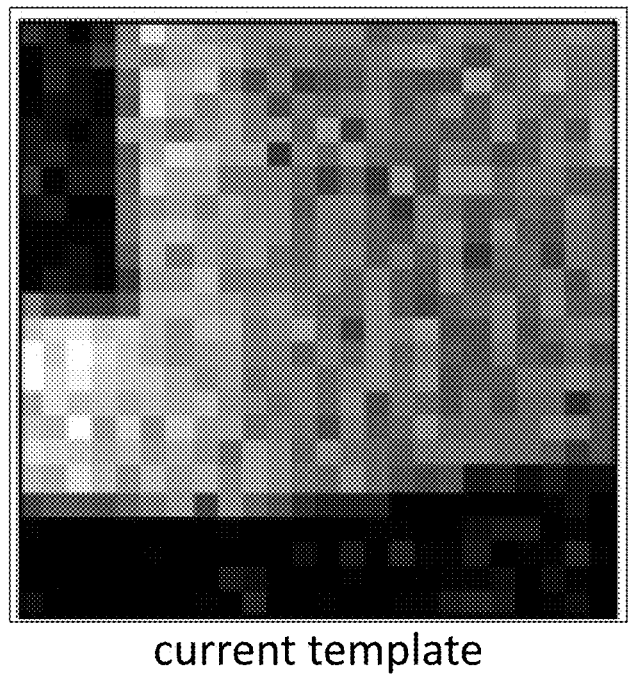

FIGS. 5A-5C are simulated images that illustrate template-based image stabilization. In these examples, the template is defined as a fixed region of pixels within each frame. The template for each frame is compared to the original frame to determine how much motion has occurred. In FIG. 5, each figure shows the current frame, and the current template for that frame. FIG. 5A shows the original frame 0, and FIGS. 5B and 5C show later frames. In FIG. 5A, the real-world image captured by the femtoimager is 256×256 grayscale (monochrome) pixels and the template 538A is defined by the center 100×100 region of pixels, as denoted by the dashed square, although larger or smaller templates may also be used. The logo of two circular arcs 528A is the AR image superimposed on the real-world image. The template 538 is tracked in order to stabilize the AR image 528 in the same location relative to the background environment. In this approach, frame 0 is latched for comparison with the templates from later frames.

In FIG. 5B, the user looks to the right and slightly down. As a result, the current frame captured by the femtoimager is shifted to the right and slightly down relative to frame 0 of FIG. 5A. The current template 538B, which is the central 100×100 pixel region of the current frame, is also shifted to the right and slightly down. To determine the amount of shift, the current template 538B of FIG. 5B is compared against the saved frame 0 from FIG. 5A. From this comparison, it may be determined that the template 538B has shifted right and slightly down. The AR image 528B is then offset accordingly so that it appears in the same position relative to the external environment, as shown in FIG. 5B.

In FIG. 5C, the user looks farther to the right and farther down. The current frame captured by the femtoimager is shifted farther to the right and down relative to frame 0 of FIG. 5A. The system compares the current 100×100 pixel template 538C against the saved frame 0 to determine that the template has shifted farther to the right and down. The AR image 528C is offset accordingly so that it appears in the same position relative to the external environment.

Different methods may be used to compare the current template against frame 0 to determine the current offset. One approach is based on pixel shifting. The current template is shifted by different numbers of pixels in the vertical and horizontal directions until the best match against frame 0 is found. Another approach is based on cross-correlation. The current template is cross-correlated against frame 0 and the position of best correlation determines the amount of offset. Cross-correlation may be performed with different kernels and weighting functions. In some cases, the offset may be just a translational offset. In other cases, rotational offset may also be calculated.

Figure 6A:
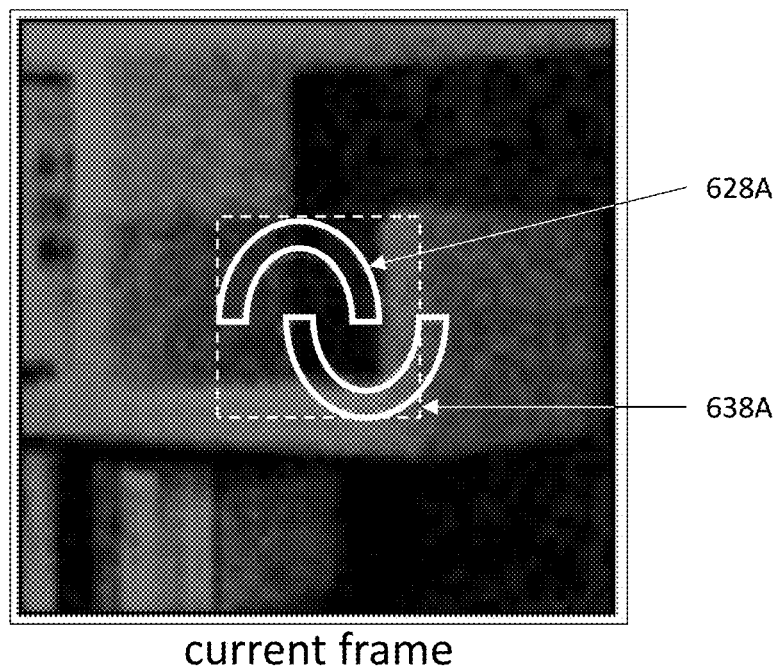
FIGS. 6A-6C are the same images in FIG. 5, but showing a different type of template-based image stabilization.
Figure 6A:
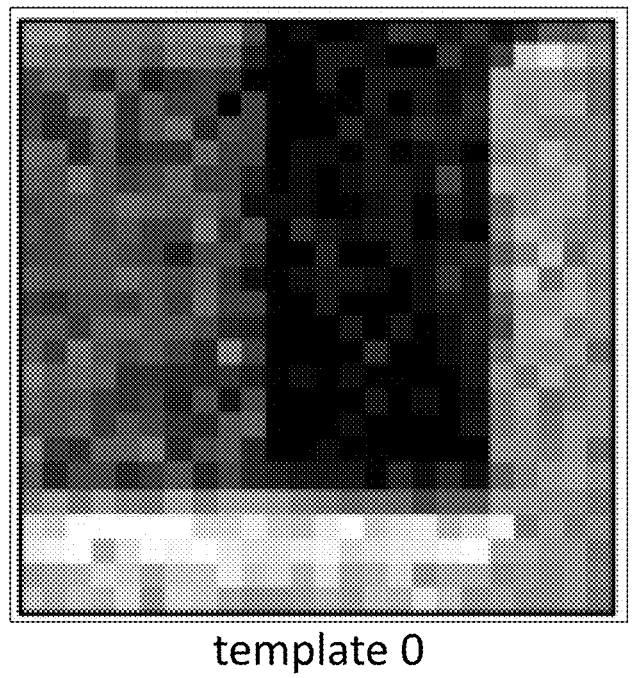
Figure 6B:
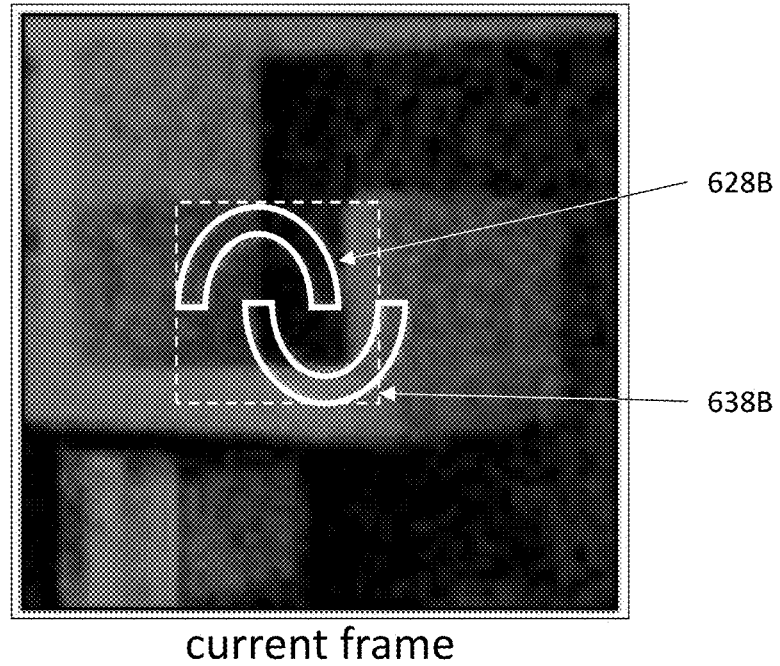
Figure 6C:
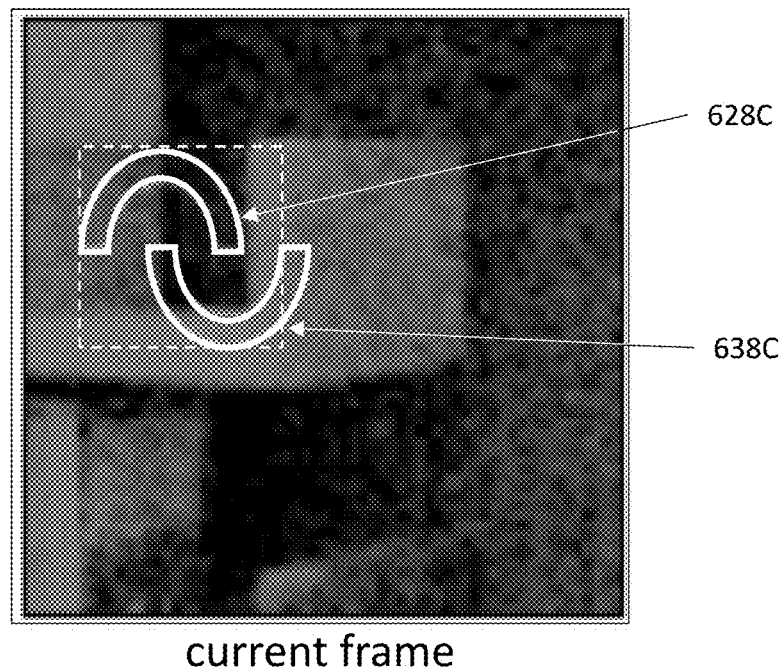

In FIGS. 5A-5C, the template was defined as a fixed region within the femtoimager field of view. If the eye moves, then the content of each template changes. The current template for subsequent frames was then compared against a reference frame 0 (i.e., latched frame). FIGS. 6A-6C show an alternate approach in which the content of the template is fixed (i.e., latched template), and that template is used as the reference. These figures use the same example as in FIGS. 5A-5C. FIG. 6A shows the same frame, AR image 628A and template 638A as in FIG. 5A. Here, the template is labelled as "template 0" because it will be used as the reference for comparison, where frame 0 was the reference for comparison in FIGS. 5A-5C. FIG. 6B shows the same frame as FIG. 5B. However, in this approach, the template 0 from FIG. 6A is compared against the current frame of FIG. 6B to determine the estimated location of template 0, which is denoted by the dashed rectangle 638B. This is then used to adjust the position of the AR image 628B. Note that, in this approach, the AR image 628B and template 638B have a fixed position relative to each other. FIG. 6C shows the same process but using the frame from FIG. 5C. The system matches the template 0 against the current frame to determine the template 0 position 638C within the frame. From this, the offset of the AR image 628C may be determined. In FIG. 6C, the template 638C is approaching the edge of the femtoimager's FOV. When this happens, the template may be reset by selecting a different region of pixels more in the center of the FOV to serve as the template.

Referring to FIG. 3, step 320 may also be implemented using a feature based approach. In this approach, a set of features are extracted from the real-world images. Examples of features include edges, corners, image gradients and other types of localized patterns. These features are tracked across the sequence of captured images and that information is used to stabilize the AR images from the femtoprojector.

Figure 7:
FIG. 7 is an AR image to be overlaid on the external environment.

FIGS. 7-8 are simulated images that show feature-based image stabilization. FIG. 7 shows a menu, which provides the AR image to be overlaid on the external environment in a stationary position. As the user looks around in the external environment, different portions of the menu will be shown. In this example, the user is first looking in a direction where the portion of the menu circled and labeled 711 is the AR image to be overlaid on the external environment. The user then looks to the right, and the portion of the menu labeled 712 is the AR image to be overlaid on the user's new view of the real world.

Figure 8A:
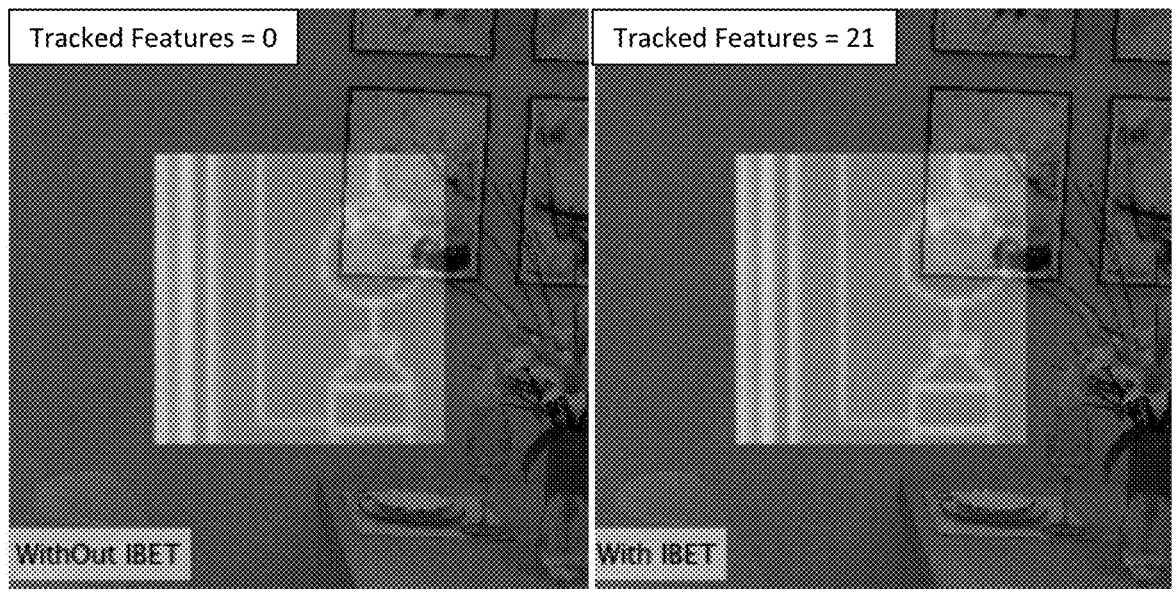
FIGS. 8A-8H are simulated images that show feature-based image stabilization.
Figure 8B:
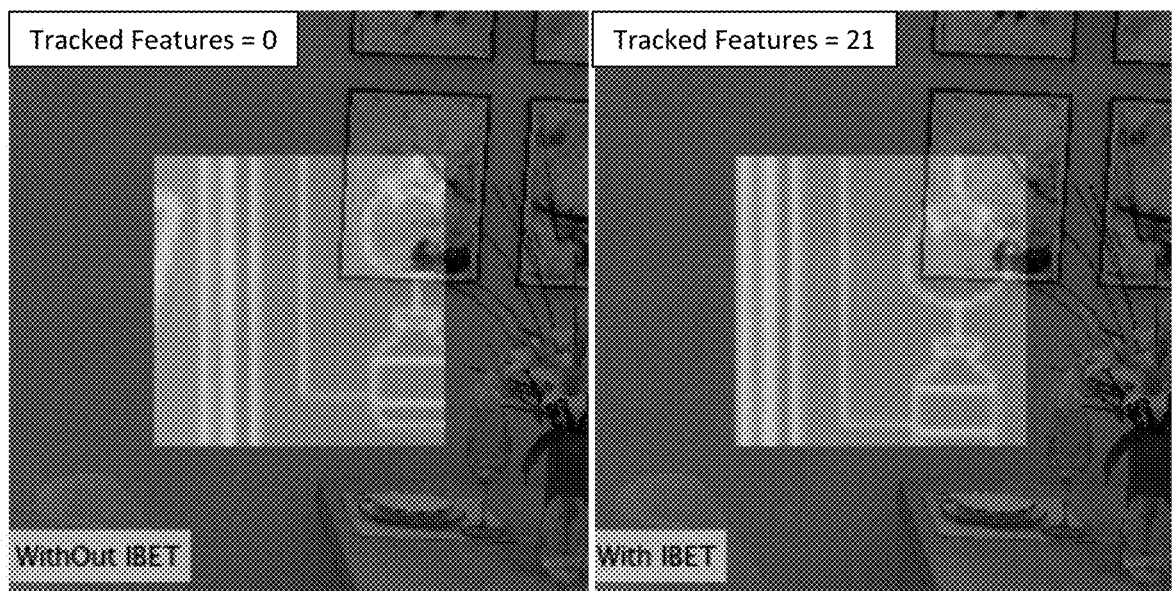
Figure 8C:
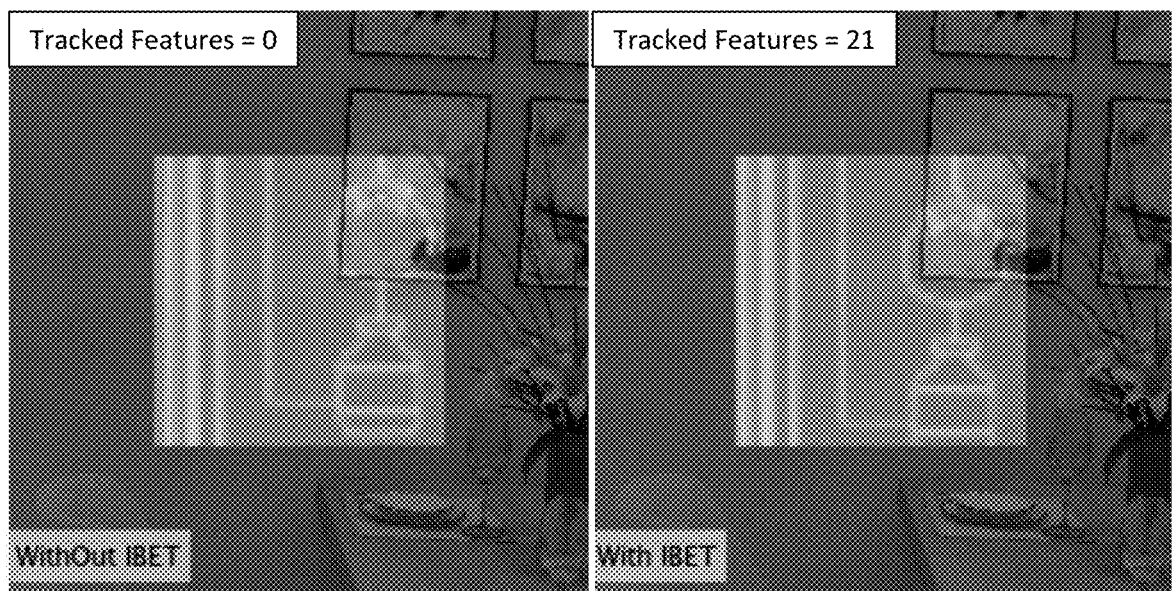
Figure 8D:
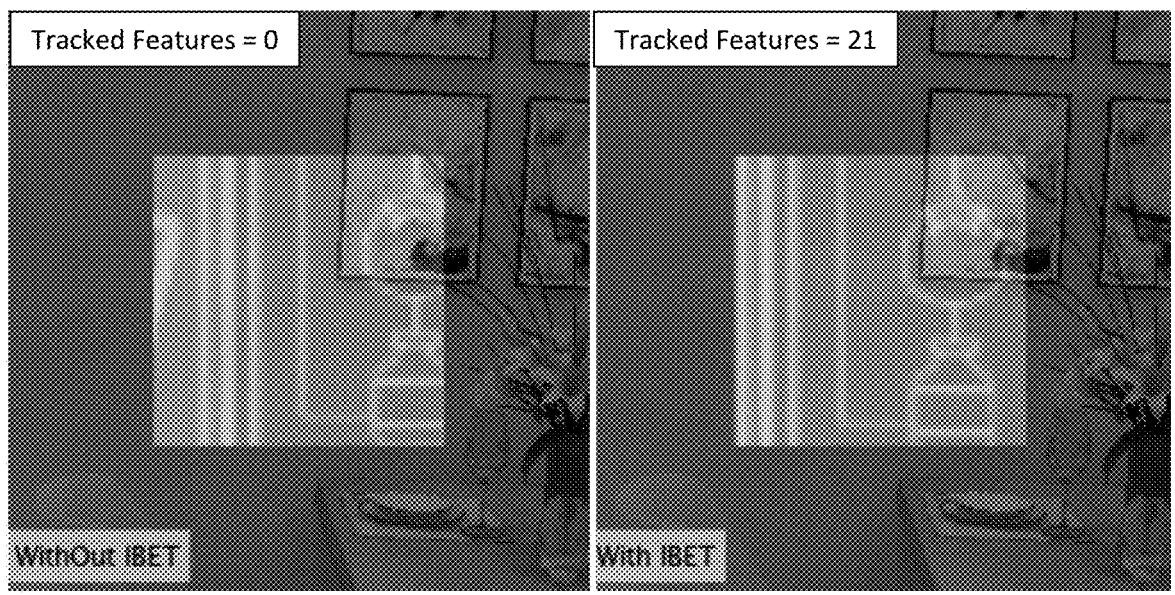

FIGS. 8A-8H show a time sequence of images of the external environment with the AR image overlaid. The left side shows the result without image stabilization (without image-based eye tracking or IBET) and the right side shows the result with image stabilization. In FIGS. 8A-8D of this example, the user's gaze is fixed, so the background environment does not move. In the time sequence from FIGS. 8A-8D, the overlaid AR image on the left first shifts to the right (FIG. 8B), then returns to centered (FIG. 8C) and then moves to the right again (FIG. 8D). The instability in the left set of AR images may be caused by eye motion or by imprecision in the overall system.

The feature tracking on the right set of images stabilizes the AR image relative to the external environment. The number of features being tracked is shown in the upper left of each image. In this example, 21 features from the external environment are tracked. The features are corners, which are identified by intensity gradients in the image. The number of features depends on the content of the captured images. More features generally provide more reliable tracking, but also requires larger images and more processing power. In some cases, at least 10 features or at least 20 features are tracked.

Figure 8E:
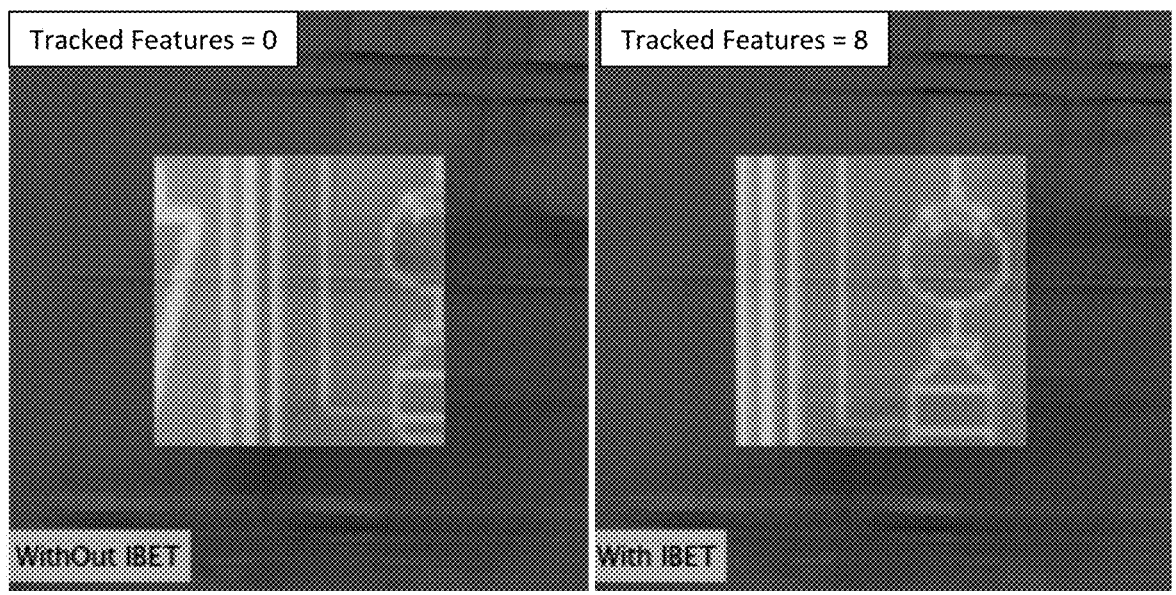
Figure 8F:
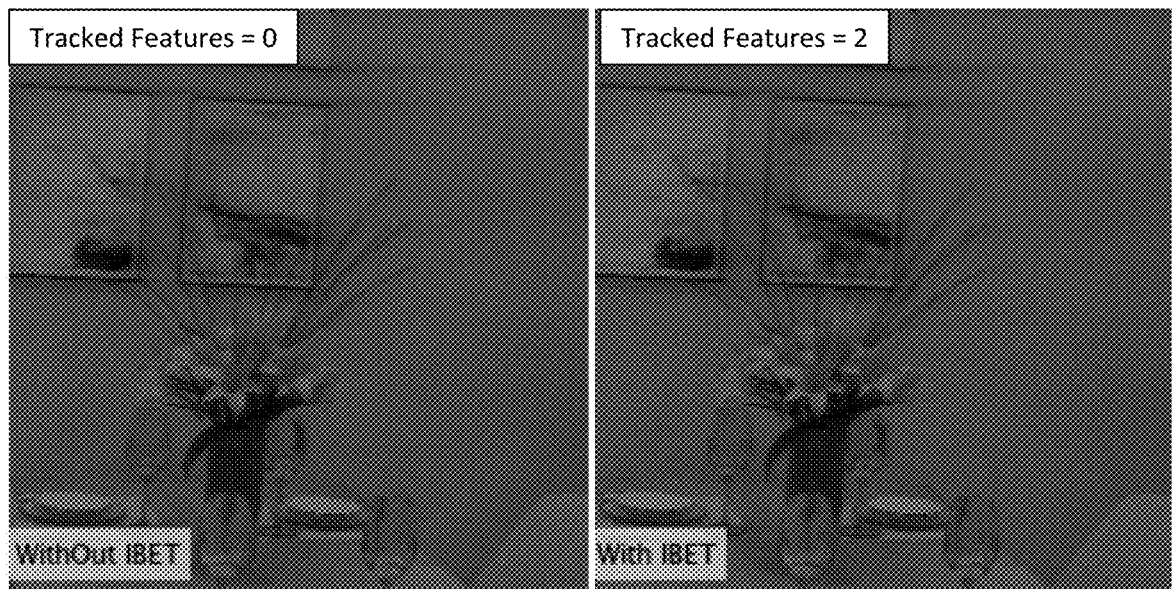
Figure 8G:
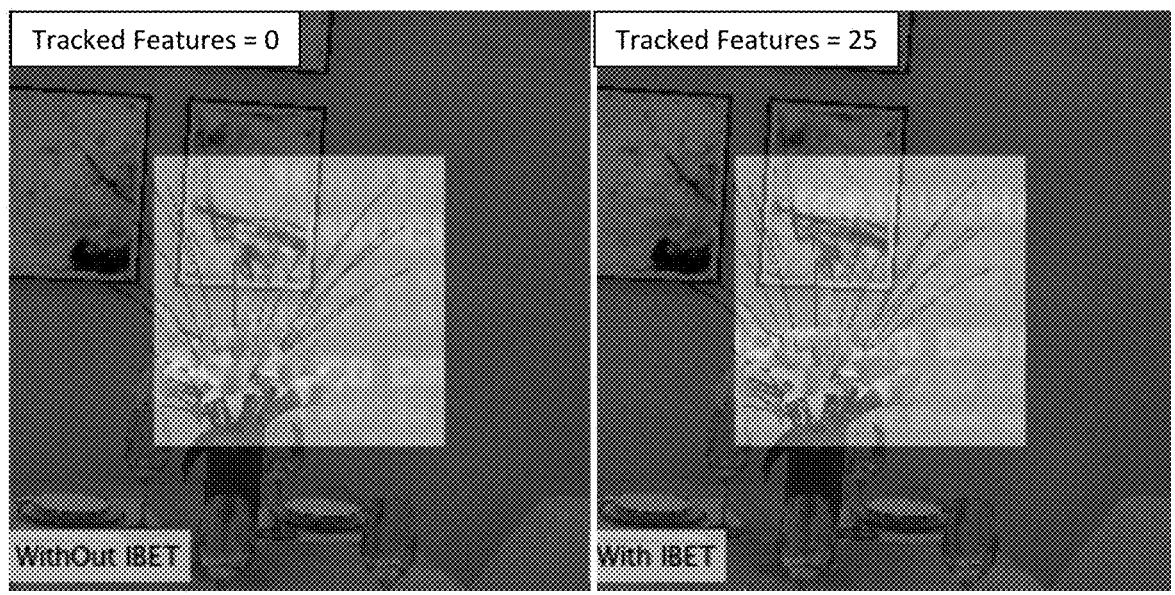
Figure 8H:
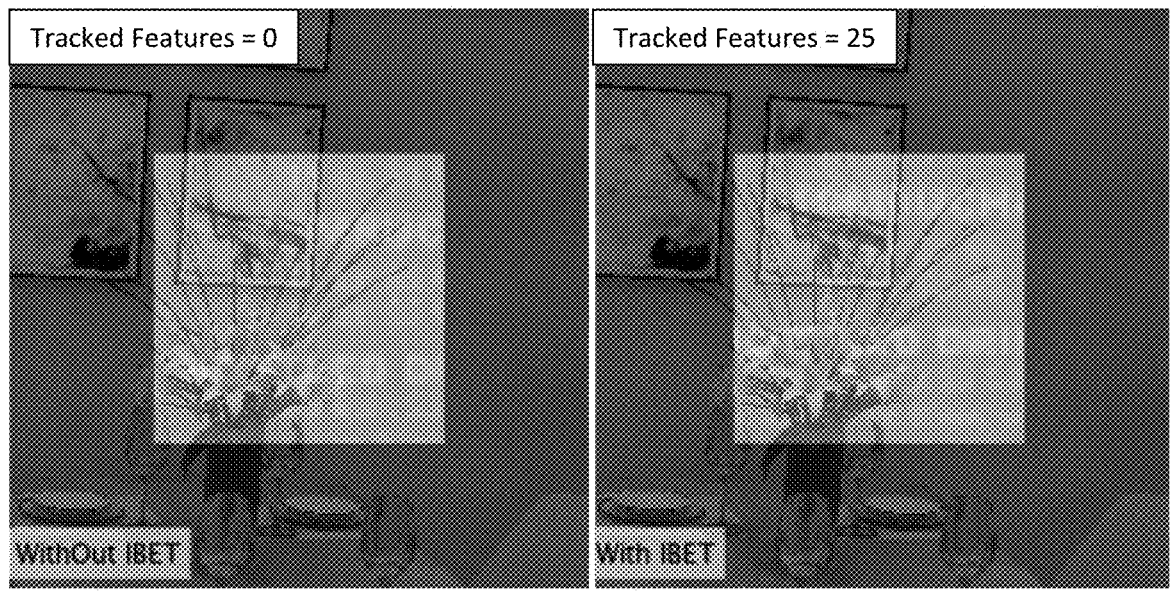

In FIG. 8E, the user is starting to look to the right. The background is blurry to illustrate the eye motion, and the number of tracked features also decreases. FIG. 8F shows the user's view of the external environment at the end of the eye saccade to the right. FIG. 8G shows a frame shortly after FIG. 8F. Here, the system has determined the correct portion 712 of the menu to display. This may be determined using other means (e.g., inertial motion sensors). In some cases, feature tracking may also be used for this purpose. In FIG. 8G, 25 features from the external environment are tracked. FIG. 8H once again shows image stabilization while the user is gazing at a fixed spot in the outside world.

The position and/or orientation (i.e., rotation) of the set of features may be tracked from frame to frame. Some approaches may assume rigid transformation, meaning that all the features are assumed to lie on the same plane with a fixed relative position between them. The motion of the feature set then has three degrees of freedom: translation in x, translation in y and rotation in θ (in-plane rotation). The estimated motion for each individual feature is then used to determine the estimated motion of the rigid set of features. More complex models may also be used, for example taking into account possible three-dimensional motion of the features relative to each other.

Figure 9:
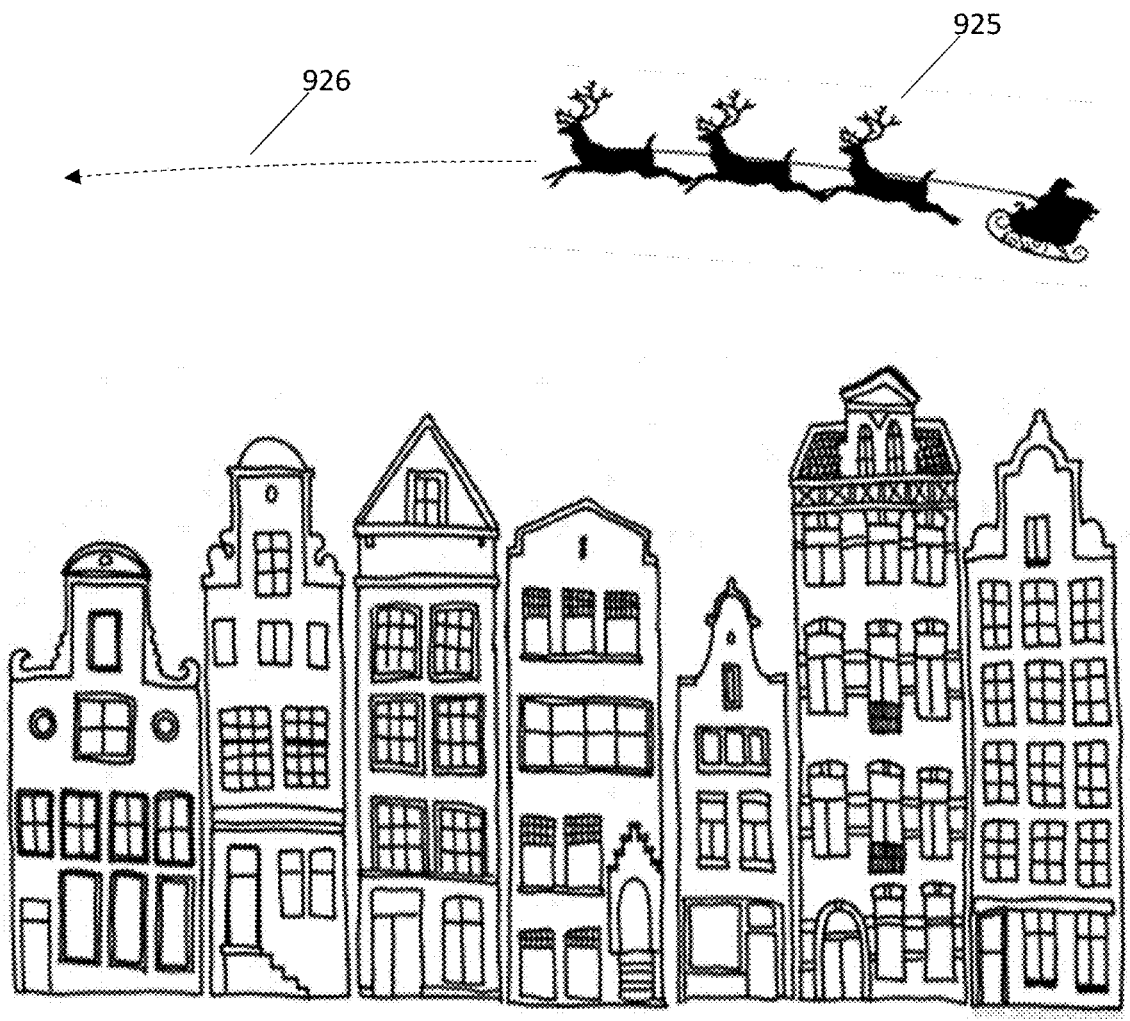
FIG. 9 shows image stabilization of a moving AR image.

In the examples above, image stabilization is used to ensure that the AR virtual image appears stationary relative to the external environment. Image stabilization is not limited to this situation. FIG. 9 shows image stabilization of a moving AR image 925. In this example, the buildings are the user's view of the real world. The Santa Claus and flying reindeer 925 is the overlaid AR image. The AR image 925 is supposed to follow a smooth trajectory 926 as Santa Claus flies through the air. However, eye motion without correction may make the trajectory appear jerky or irregular. The techniques described above may be used to stabilize the AR image 925 along the intended trajectory 926.

Figure 10:
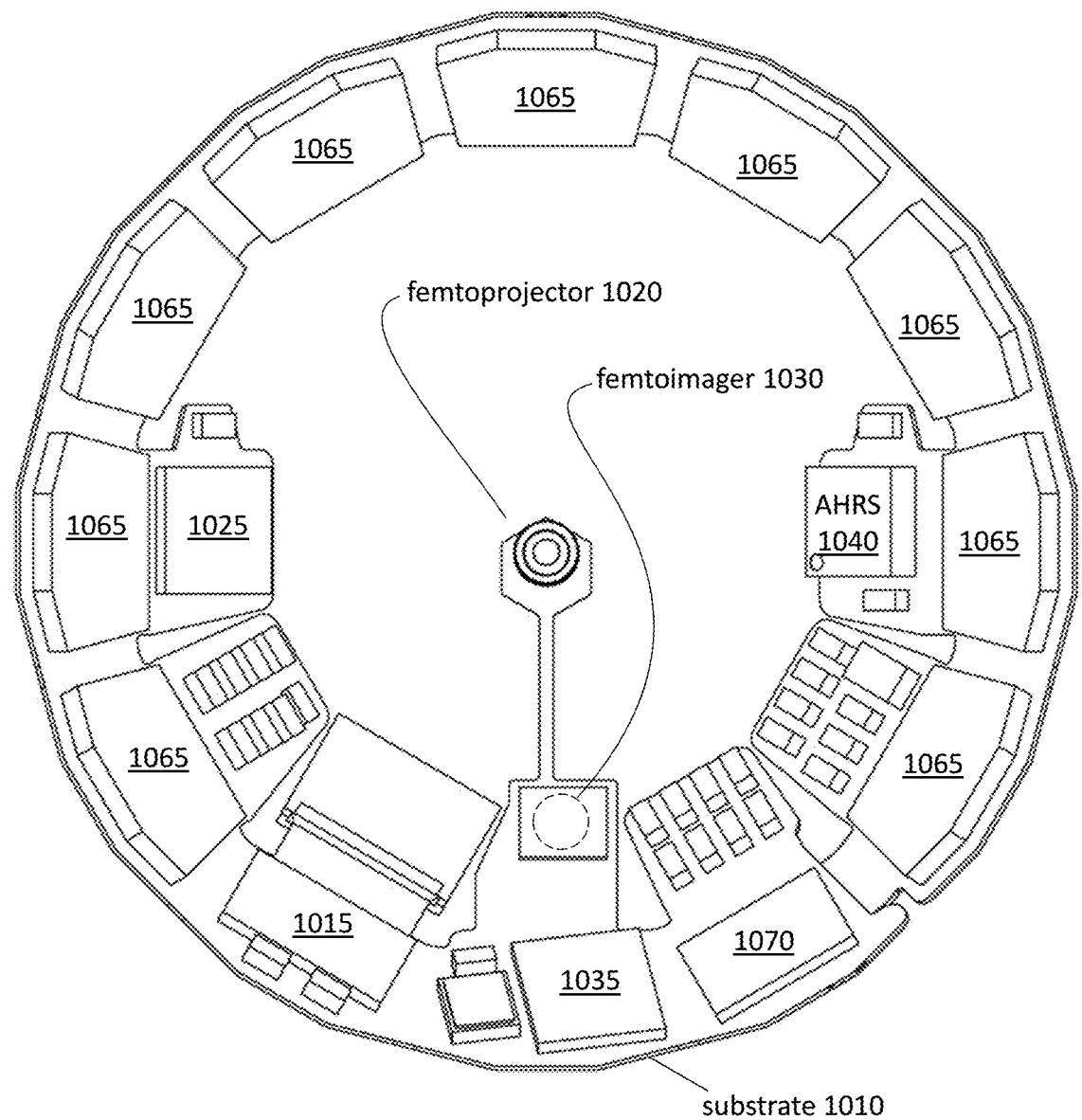
FIG. 10 is a posterior view of an electronics assembly for use in an electronic contact lens.

The functionality described above for image stabilization may be implemented in different ways. FIG. 10 is a posterior view of an electronics assembly for use in an electronic contact lens that includes some of the functionality, with the rest of the functionality implemented off-lens (i.e., outside the contact lens). The electronics assembly is approximately dome-shaped in order to fit into the contact lens. The posterior view of FIG. 10 shows a view from inside the dome. The perimeter of the dome is close to the viewer and the center of the dome is away from the viewer. The surfaces shown in FIG. 10 face towards the user's eye when the user is wearing the contact lens.

This particular design has a flexible printed circuit board 1010 on which the different components are mounted. Conductive traces on the circuit board provide electrical connections between the different components. This flexible substrate 1010 may be formed as a flat piece and then bent into the three-dimensional dome shape to fit into the contact lens. In the example of FIG. 10, the components include a femtoprojector 1020 and a femtoimager 1030. The femtoimager 1030 is facing outwards, so it is on the opposite side of the substrate 1010 and is shown by hidden lines in FIG. 10. Other components include receiver/transmitter circuitry 1015, eye tracking/image stabilization circuitry 1025, a display pipeline 1035, attitude and heading sensors and circuitry 1040 (such as accelerometers, magnetometers and gyroscopes), batteries 1065 and power circuitry 1070. The electronic contact lens may also include antennae and coils for wireless communication and power transfer.

The functionality of the electronic contact lens includes a data/control receive path, a data/control transmit path, and a power subsystem. In this example, the receive path of the data/control subsystem includes an antenna (not shown in FIG. 10), receiver/transmitter circuitry 1015, a display pipeline 1035, and femtoprojector 1020. Data from an external source is wirelessly transmitted to the contact lens and received via the antenna. The receiver circuitry 1015 performs the functions for receiving the data, for example demodulation, noise filtering, and amplification. It also converts the received signals to digital form. The display pipeline 1035 processes the digital signals for the femtoprojector 1020. These functions may include decoding and timing. The processing may also depend on other signals, for example the image stabilization described above, other types of eye tracking 1040/1025 or ambient light sensing. The femtoprojector 1020 projects the AR images onto the wearer's retina. In this example, the femtoprojector 1020 includes a CMOS ASIC backplane, LED frontplane and projection optics.

The data/control subsystem may also include a back channel through transmitter circuitry 1015 and the antenna. For example, if part of the image stabilization is performed off-lens, the relevant data may be transmitted through this back channel to the off-lens component(s). The contact lens may also transmit other types of eye tracking data, control data and/or data about the status of the contact lens.

The image stabilization described above includes a feedback path from the femtoimager 1030 to the femtoprojector 1020. The femtoimager 1030 captures images of the real world. These may be processed by image stabilization circuitry 1025. If image stabilization is performed entirely on-lens, then the image stabilization circuitry 1025 feeds back to the data pipeline for the femtoprojector 1020. If off-lens processing is used, then data is transmitted from the image stabilization circuitry 1025 via the back channel to off-lens components. Results from those components are then returned to the electronic contact lens via the data/control receive path. The image stabilization described above may be used in combination with eye tracking from the AHRS (attitude and heading reference system) 1040.

The real-world images captured by the femtoimager may also be used to expressly track the motion of the user's eye, for example tracking the rotation or spatial position of the user's eye, based on a comparison of the captured images over time. This may then be used to stabilize the AR images from the femtoprojector. Note, however, that image stabilization may be implemented without expressly calculating the eye's position or orientation.

Power may be received wirelessly via a power coil. This is coupled to circuitry 1070 that conditions and distributes the incoming power (e.g., converting from AC to DC if needed). The power subsystem may also include energy storage devices, such as batteries 1065 or capacitors. Alternatively, the electronic contact lens may be powered by batteries 1065, and the batteries recharged wirelessly through a coil.

In addition to the on-lens components shown in FIG. 10, the overall system may also include off-lens components that are outside the contact lens. For example, head tracking and eye tracking functions may be performed partly or entirely off-lens. The data pipeline may also be performed partially or entirely off-lens. The power transmitter coil is off-lens, the source of image data and control data for the contact lens display is off-lens, and the receive side of the back channel is off-lens.

There are also many ways to implement the different off-lens system functions. Some portions of the system may be entirely external to the user, while other portions may be worn by the user in the form of a headpiece or glasses. Components may also be worn on a belt, armband, wrist piece, necklace, or other types of packs.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for stabilizing AR images produced by an inward-facing femtoprojector mounted on a user's eye, the femtoprojector projecting the AR images onto the user's retina, the method comprising:
   an outward-facing femtoimager capturing a sequence of real-world images of an external environment, wherein the femtoimager is also mounted on the user's eye;
   comparing the captured real-world images in the sequence over time; and
   adjusting an offset of the projected AR images to stabilize a visual alignment between the AR images and the external environment, wherein the adjustment of the offset is based on the comparison of the captured real-world images over time.

2. The method of claim 1 wherein adjusting the offset of the projected AR images compensates for visual misalignment caused by a microsaccadic motion of the user's eye.

3. The method of claim 1 wherein adjusting the offset of the projected AR images compensates for visual misalignment caused by involuntary motion of the user's eye while the user's gaze is fixated at a single point.

4. The method of claim 1 wherein adjusting the offset of the projected AR images compensates for visual misalignment caused by a smooth pursuit motion of the user's eye.

5. The method of claim 1 wherein adjusting the offset of the projected AR images includes adjusting a rotational offset of the AR images.

6. The method of claim 1 wherein comparing the captured real-world images over time comprises:
   selecting a template defined by a region of pixels in one of the real-world images; and
   tracking the template in real-world images in the sequence.

7. The method of claim 6 wherein selecting the template is based on detail in and contrast of pixels in the region.

8. The method of claim 6 wherein selecting the template comprises:
   selecting a size of the template based on a speed of motion of the gaze.

9. The method of claim 6 wherein tracking the template in real-world images in the sequence is based on pixel shifting of the template.

10. The method of claim 6 wherein tracking the template in real-world images in the sequence is based on cross-correlation of the template with the real-world images.

11. The method of claim 6 wherein the template is not larger than 100×100 pixels.

12. The method of claim 1 wherein comparing the captured real-world images over time comprises:
   extracting a set of features from one of the real-world images; and
   tracking the features in real-world images in the sequence.

13. The method of claim 12 wherein the set of features include at least one of: corners, and features based on image gradients.

14. The method of claim 12 wherein the set of features includes at least 10 different features.

15. The method of claim 12 wherein tracking the features comprises:
   tracking a position and an orientation of the features in subsequent real-world images in the sequence.

16. The method of claim 1 wherein tracking the gaze over time is based on an assumption of rigid transformation of views of the external environment.

17. The method of claim 1 wherein both the femtoprojector and the femtoimager are mounted in a contact lens and the contact lens is mounted at a fixed position on the user's eye, so that both the femtoprojector and the femtoimager move in unison with the user's eye as the eye rotates.

18. The method of claim 1 wherein adjusting the offset of the projected AR images comprises:
   tracking a motion of the user's eye over time, based on the comparison of the captured real-world images over time; and
   adjusting the offset of the projected AR images based on the tracked motion.

19. The method of claim 1 wherein a field of view of the femtoimager is not more than 15 degrees.

20. The method of claim 1 wherein the femtoimager captures images of not more than 256×256 pixels.

* * * * *